US 11,499,750 B2

(12) United States Patent
Kim et al.

(10) Patent No.: US 11,499,750 B2
(45) Date of Patent: Nov. 15, 2022

(54) GAS FURNACE TO PRODUCE HEATED AIR AND OPTIONALLY HOT WATER VIA A BYPASS PIPE

(71) Applicant: LG ELECTRONICS INC., Seoul (KR)

(72) Inventors: Jusu Kim, Seoul (KR); Doyong Ha, Seoul (KR); Yongki Jeong, Seoul (KR); Janghee Park, Seoul (KR); Hansaem Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/941,325

(22) Filed: Jul. 28, 2020

(65) Prior Publication Data

US 2021/0033305 A1  Feb. 4, 2021

(30) Foreign Application Priority Data

Jul. 30, 2019 (KR) .................. 10-2019-0092706

(51) Int. Cl.
*F24H 6/00* (2022.01)
*F28F 9/26* (2006.01)
(Continued)

(52) U.S. Cl.
CPC .............. *F24H 6/00* (2013.01); *F23M 9/003* (2013.01); *F24H 1/186* (2013.01); *F28F 9/26* (2013.01); *F28F 27/02* (2013.01); *F28F 2250/06* (2013.01)

(58) Field of Classification Search
CPC ............... F23J 2900/11001; F23J 15/06; F23J 2900/15004; F23M 9/003; F24H 6/00; F24H 1/186; F24H 1/06; F24H 8/00; F24H 3/00; F24H 9/0031; F24H 9/0068; F28F 9/26; F28F 2250/06; F28F 27/02; F28F 13/08; F24D 2200/18; F24D 5/02;
(Continued)

(56) References Cited

U.S. PATENT DOCUMENTS 4,401,261 A *  8/1983  Brown ................ F28D 21/0007
                                                     237/19
2010/0186926 A1 *  7/2010  Varlaro .................. F24D 12/02
                                                       165/47
(Continued)

FOREIGN PATENT DOCUMENTS

KR  101580306 B1 * 12/2015

*Primary Examiner* — Steven B McAllister
*Assistant Examiner* — John E Bargero
(74) *Attorney, Agent, or Firm* — Dentons US LLP

(57) ABSTRACT

Provided is a gas furnace including a primary heat exchanger and a secondary heat exchanger through which a combustion gas produced by the combustion of a fuel gas flows. The gas furnace includes: a coupling box serving as an intermediary to connect the primary heat exchanger and the secondary heat exchanger; a collect box connected to the secondary heat exchanger, for letting in the combustion gas passed through the secondary heat exchanger; an inducer connected to the collect box, for inducing a flow of the combustion gas; and a bypass pipe connected to one side of the coupling box and including a bypass pipe for guiding the combustion gas passed through the primary heat exchanger to a hot water supply tank for supplying hot water to an indoor space.

9 Claims, 10 Drawing Sheets

(51) Int. Cl.
*F23M 9/00* (2006.01)
*F24H 1/18* (2022.01)
*F28F 27/02* (2006.01)

(58) Field of Classification Search
CPC .... F24D 5/00; F24D 19/1066; F28D 21/0007; F28D 21/0008; F28D 21/0003; F28D 21/0005; Y02B 30/18; Y10S 165/901
USPC ............ 237/19; 165/103, 283, 297; 126/101
See application file for complete search history.

(56) References Cited

U.S. PATENT DOCUMENTS

2014/0202442 A1* 7/2014 Haydock .................. F24H 8/00
165/185
2016/0018113 A1* 1/2016 Hagensen ................ F23J 15/06
122/20 B

* cited by examiner

GAS FURNACE TO PRODUCE HEATED AIR AND OPTIONALLY HOT WATER VIA A BYPASS PIPE

CROSS-REFERENCE TO RELATED APPLICATION

This application claims the priority from Korean Patent Application No. 10-2019-0092706, filed on Jul. 30, 2019, in the Korean Intellectual Property Office, the disclosure of which is incorporated herein by reference in its entirety.

FIELD OF THE DISCLOSURE

The present disclosure relates to a gas furnace. More particularly, the present disclosure relates to a gas furnace that can supply energy required for indoor hot water supply as well as for indoor heating by bypassing a combustion gas flowing through a heat exchanger and guiding it to a hot water supply tank.

RELATED ART

Generally, a gas furnace is an apparatus that heats up a room by supplying air heated through heat exchange with a flame and high-temperature combustion gas produced by the combustion of a fuel gas.

Apart from the gas furnace, a hot water supply tank is installed in a home or building to supply hot water to an indoor space, but a burner or electrical heater needs to be installed to supply energy required to heat the water stored in the hot water supply tank.

In the case of conventional gas furnaces equipped with primary and secondary heat exchangers, a high-temperature combustion gas flowing through the heat exchangers is not used other than for increasing the temperature of heating air supplied to an indoor space, thus leading to a loss of energy as waste heat.

That is, the conventional gas furnaces are now in need of development of technologies for the supply of energy required to heat water stored in a hot water supply tank by using a high-temperature combustion gas.

SUMMARY OF THE DISCLOSURE

A first problem to be solved by the present disclosure is to provide a gas furnace that can supply energy required for indoor hot water supply as well as for indoor heating.

A second problem to be solved by the present disclosure is to provide a gas furnace that can bypass a combustion gas flowing through a heat exchanger to a hot water supply tank while minimizing design change points.

Technical problems to be solved by the present disclosure are not limited to the above-mentioned technical problems, and other technical problems not mentioned herein may be clearly understood by those skilled in the art from description below.

The present disclosure provides a gas furnace including a primary heat exchanger and a secondary heat exchanger through which a combustion gas produced by the combustion of a fuel gas flows.

To solve the above-mentioned problems, a gas furnace according to the present disclosure includes: a coupling box serving as an intermediary to connect the primary heat exchanger and the secondary heat exchanger; a collect box connected to the secondary heat exchanger, for letting in the combustion gas passed through the secondary heat exchanger; an inducer connected to the collect box, for inducing a flow of the combustion gas; and a bypass pipe connected to one side of the coupling box and including a bypass pipe for guiding the combustion gas passed through the primary heat exchanger to a hot water supply tank for supplying hot water to an indoor space.

The coupling box may further include a partition wall having an opening formed therein, facing the primary heat exchanger and secondary heat exchanger, and disposed at a corresponding position between the primary heat exchanger and the secondary heat exchanger, wherein the partition wall divides the coupling box into a first box and a second box which communicate with the primary heat exchanger and secondary heat exchanger, respectively.

The partition wall may have a plurality of first holes formed therein to allow the first box and the second box to communicate with each other, and the first box may have a plurality of second holes formed in a first box sidewall adjacent to the partition wall to allow the first box and the bypass pipe to communicate with each other.

The bypass pipe may further include a first bypass pipe and a second bypass pipe, with one end of each being connected to the first box sidewall, spaced apart from each other in the lengthwise direction of the partition wall.

The other end of the bypass pipe opposite the one end may be connected to the collect box, and the one end of the bypass pipe may be positioned higher than the other end.

In some embodiments, the gas furnace may include: a damper disposed on the partition wall and the first box sidewall to open either the first or second holes and close the others; and a motor electrically driven and providing power for varying the position of the damper.

Means for solving other problems not mentioned above will be easily deduced from the descriptions of embodiments of the present disclosure.

DESCRIPTION OF EXEMPLARY EMBODIMENTS

Figure 1:
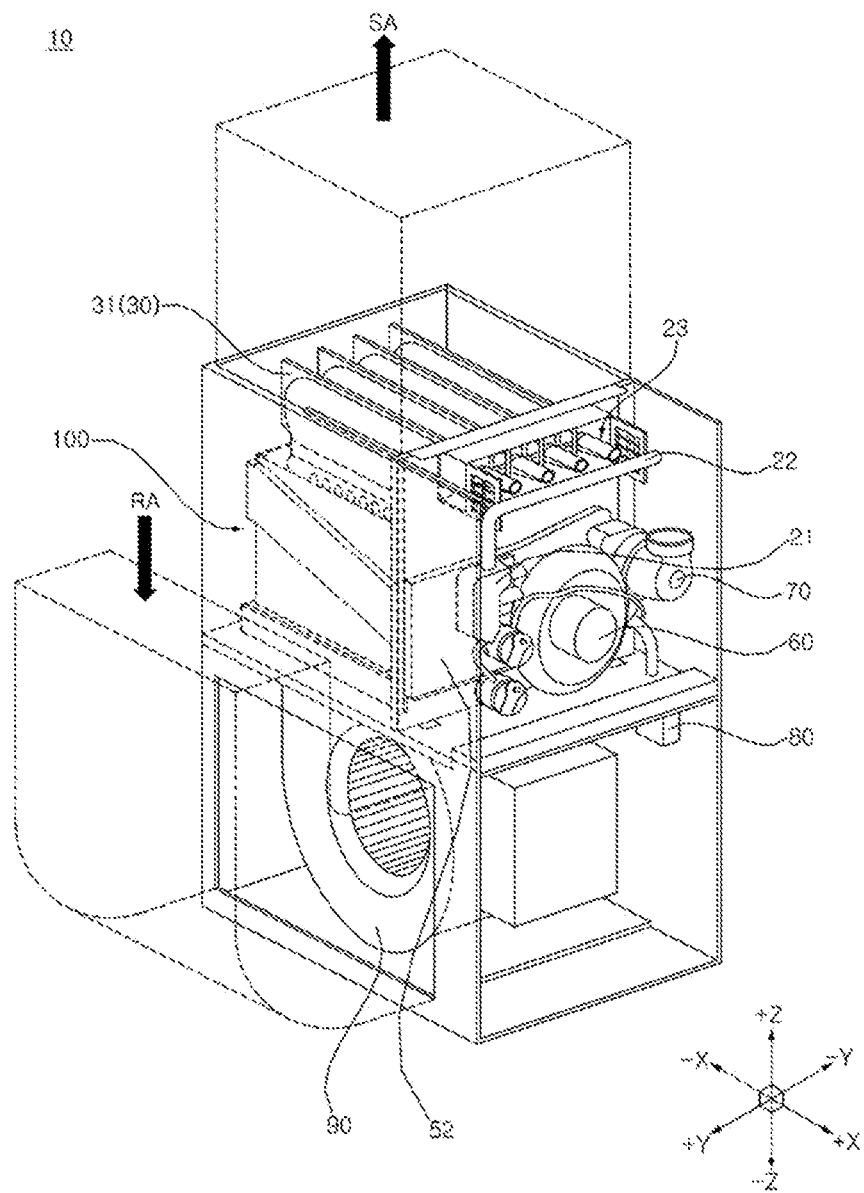
FIG. 1 is a perspective view of a gas furnace according to an exemplary embodiment of the present disclosure.

Advantages and features of the present disclosure and methods for achieving them will be made clear from embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is merely defined by the scope of the claims. Like reference numerals refer to like elements throughout the specification.

The present disclosure will be described with respect to a spatial orthogonal coordinate system illustrated in FIG. 1 and other figures where X, Y, and Z axes are orthogonal to each other. In this specification, the X axis, Y axis, and Z axis are defined assuming that the up-down direction is along the Z axis and the front-back direction is along the X axis. Each axis direction (X-axis direction, Y-axis direction, and Z-axis direction) refers to two directions in which each axis runs. Each axis direction with a '+' sign in front of it (+X-axis direction, +Y-axis direction, and +Z-axis direction) refers to a positive direction which is one of the two directions in which each axis runs. Each axis direction with a '−' sign in front of it (−X-axis direction, −Y-axis direction, and −Z-axis direction) refers to a negative direction which is the other of the two directions in which each axis runs.

Hereinafter, a gas furnace according to an exemplary embodiment of the present disclosure will be described with reference to FIG. 1.

FIG. 1 is a perspective view of a gas furnace according to an exemplary embodiment of the present disclosure.

Generally, a gas furnace is an apparatus that heats up a room by supplying air heated through heat exchange with a flame and high-temperature combustion gas P produced by the combustion of a fuel gas R.

Referring to FIG. 1, the gas furnace 10 according to the exemplary embodiment of the present disclosure includes a gas valve 21 that supplies a fuel gas R to a manifold 22, a burner 23 in which the fuel gas R released from the manifold 22 is mixed with air and flows in an air-fuel mixture, and a heat exchanger 30 through which a combustion gas P produced by the combustion of the air-fuel mixture in the burner 23 flows.

Furthermore, the gas furnace 10 include an inducer 60 for inducing a flow of combustion gas P to an exhaust pipe 70 through the heat exchanger 30, a blower 90 for blowing air around the heat exchanger 30 so that the air is supplied to a room, and a condensate trap 80 for collecting a condensate produced in the heat exchanger 30 and/or the exhaust pipe 70 and discharging it.

The fuel gas R supplied through the gas valve 21 may include, for example, liquefied natural gas (LNG), which is natural gas that has been cooled down to liquid form, or liquefied petroleum gas (LPG), which is prepared by pressurizing gaseous by-products of petroleum refining into liquid form.

As the gas valve 21 opens or closes, the fuel gas R may be supplied to the manifold 22 or its supply may be cut off. Also, the amount of fuel gas R supplied to the manifold 22 may be regulated by adjusting the opening degree of the gas valve 21. As such, the gas valve 21 may regulate the heating power of the gas furnace 10. To this end, the gas furnace 10 may further include a controller for adjusting the opening or closing of the gas valve 21 or its opening degree.

The manifold 22 may guide the fuel gas R to the burner 23, and the fuel gas R, once introduced into the burner 23, may flow in a mixture with air.

The air-fuel mixture flowing through the burner 23 may be burnt due to flame ignition by an igniter. In this case, the combustion of the air-fuel mixture may produce a flame and a high-temperature combustion gas P.

The heat exchanger 30 may have a flow path through which the combustion gas P can flow. The gas furnace 10 according to the exemplary embodiment of the present disclosure may include a heat exchanger 30 including a primary heat exchanger 31 and a secondary heat exchanger 32 which are to be described later.

The primary heat exchanger 31 may be placed with one end being adjacent to the burner 23. The other end of the primary heat exchanger 31 opposite the one end may be attached to a coupling box 110. The combustion gas P flowing from one end of the primary heat exchanger 31 to the other end may be conveyed to the secondary heat exchanger 32 via the coupling box 110.

One end of the secondary heat exchanger 32 may be connected to the coupling box 110. The combustion gas P, once passed through the primary heat exchanger 31, may be introduced into one end of the secondary heat exchanger 32 and pass through the secondary heat exchanger 32. As such, the coupling box 110 is often referred to as a hot collect box (HCB) in that it guides combustion gases P of high temperature (around 180 to 220° C.) passed through the primary heat exchanger 31 to the secondary heat exchanger 32.

The secondary heat exchanger 32 may allow the combustion gas P passed through the primary heat exchanger 31 to exchange heat with the air passing around the secondary heat exchanger 32. That is, the thermal energy of the combustion gas P passed through the primary heat exchanger 31 through the secondary heat exchanger 32 may be additionally used by means of the secondary heat exchanger 32, thereby improving the efficiency of the gas furnace 10.

The combustion gas P passed through the secondary heat exchanger 32 may condense through heat transfer to the air passing around the secondary heat exchanger 32, thereby producing a condensate. In other words, the vapor contained in the combustion gas P may condense and turn into condensate.

Due to this reason, the gas furnace 10 equipped with the primary heat exchanger 31 and secondary heat exchanger 32 is also called a condensing gas furnace. The produced condensate may be collected in a collect box 52. To this end, the other end of the secondary heat exchanger 32 opposite the one end may be connected to one side of the collect box 52.

An inducer 60 may be attached to the other side of the collect box 52. The collect box 52 may have an opening formed therein. The other end of the secondary heat exchanger 32 and the inducer 60 may communicate with each other via the opening formed in the collect box 52.

That is, the combustion gas P passed through the other end of the secondary heat exchanger 32 may be released to the inducer 60 through the opening formed in the collect box 52 and then discharged out of the gas furnace 10 through the exhaust pipe 70. As such, the collect box 52 is often referred to as a cold collect box (CCB) in that it collects combustion gases P of relatively low temperature (around 40 to 60° C.) passed through the secondary heat exchanger 32 and guides them to the inducer 60.

The condensate produced in the secondary heat exchanger 32 may be released to the condensate trap 80 through the collect box 52 and then discharged out of the gas furnace 10 through a discharge opening.

The condensate trap 80 may collect and discharge the condensate produced in the exhaust pipe 70 connected to the inducer 60, as well as the condensate produced in the secondary heat exchanger 32. That is, even a combustion gas P not condensed at the other end of the secondary heat exchanger 32 may condense to form a condensate as it passes through the exhaust pipe 70, then collect at the condensate trap 80, and then be discharged out of the gas furnace 10 through the discharge opening.

The inducer 60 may communicate with the other end of the secondary heat exchanger 32 via the opening formed in the collect box 52. One end of the inducer 60 may be attached to the other side of the collect box 52, and the other end of the inducer 60 may be attached to the exhaust pipe 70.

The inducer 60 may induce a flow of combustion gas P that passes through the primary heat exchanger 31, coupling box 110, and secondary heat exchanger 32 and is discharged to the exhaust pipe 70. In this regard, the inducer 60 may be understood as an induced draft motor (IDM).

The blower 90 for the gas furnace may be located at the bottom of the gas furnace 10. Air supplied to the room may move upward from the bottom of the gas furnace 10 by the blower 90. In this regard, the blower 90 may be understood as an indoor blower motor (IBM).

The blower 90 may allow air to pass around the heat exchanger 30. The air passing around the heat exchanger 30, blown by the blower 90, may have a temperature rise by receiving thermal energy from the high-temperature combustion gas P via the heat exchanger 30. The room may be heated as the higher-temperature air is supplied to the room.

The gas furnace 10 according to the exemplary embodiment of the present disclosure may include a casing. The components of the above-described gas furnace 10 may be accommodated inside the casing.

A lower opening may be formed in a side adjacent to the blower 90, at the bottom of the casing. A room air duct D1 through which air (hereinafter, "room air") RA coming from a room passes may be installed in the lower opening.

A supply air duct D2 through which air (hereinafter, "supply air") SA supplied to the room passes may be installed in an upper opening formed at the top of the casing. That is, when the blower 90 operates, the air coming from the room through the room air duct D1 to be used as the room air RA has a temperature rise as it passes through the heat exchanger 30, and the air may be supplied to the room through the supply air duct D2 and used as the supply air SA, thereby heating the room.

Figure 2:
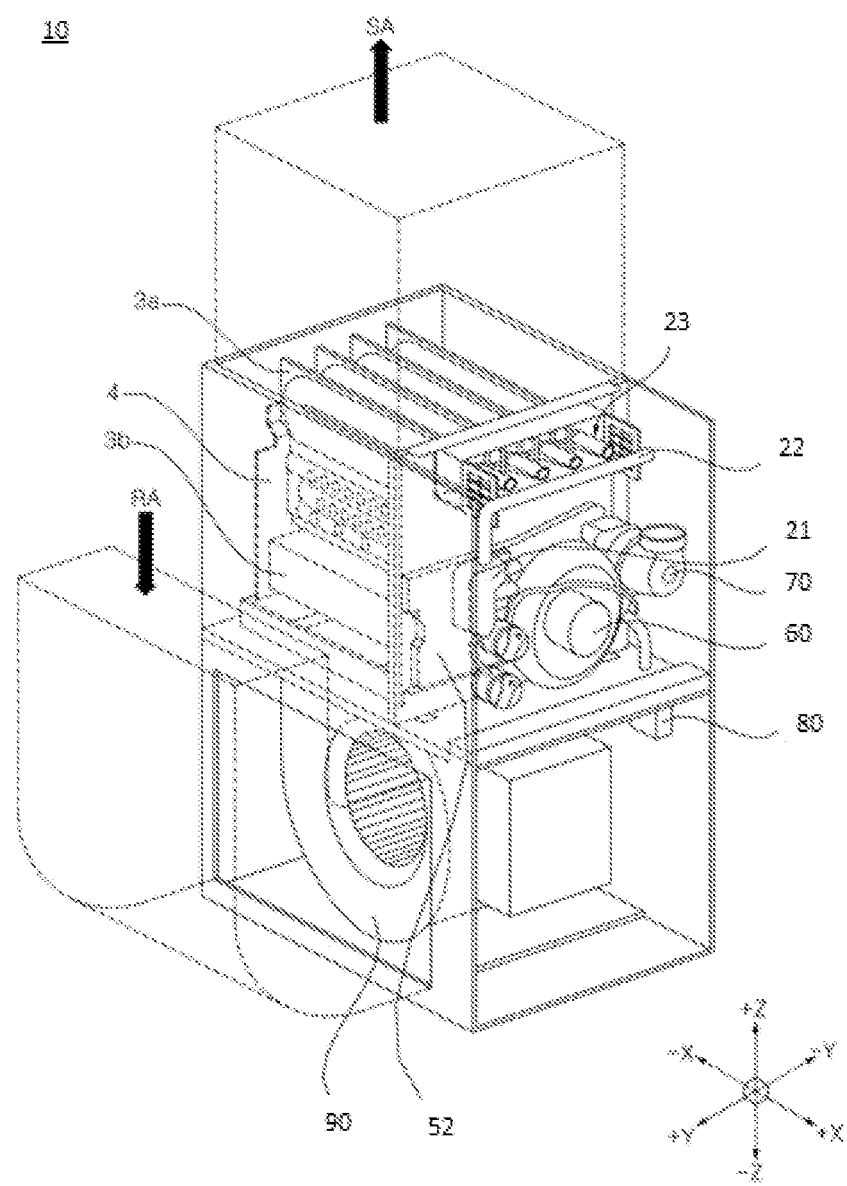
FIG. 2 is a perspective view of a gas furnace according to the related art.

FIG. 2 is a perspective view of a gas furnace according to the related art.

Referring to FIG. 2, the coupling box 4 according to the related art only can guide a combustion gas P passed through the primary heat exchanger 3a to the secondary heat exchanger 3b.

However, considering that the temperature of the combustion gas P passed through the primary heat exchanger 3a is quite high (around 180 to 220° C.), it may be desirable in terms of energy efficiency to guide the combustion gas P passed through the primary heat exchanger 3a to a hot water supply tank installed separately from the gas furnace 1, rather than to the secondary heat exchanger 3b, for use in heating the water stored in the hot water supply tank, as long as the difference between the indoor temperature and the set temperature is not too large.

In view of this, the present disclosure has been devised to provide a gas furnace 10 that can supply energy required for indoor hot water supply as well as for indoor heating by bypassing a combustion gas flowing through part of a heat exchanger and guiding it to a hot water supply tank.

Hereinafter, the gas furnace according to the exemplary embodiment of the present disclosure will be described in more specific details with reference to FIGS. 1 to 10.

Figure 3:
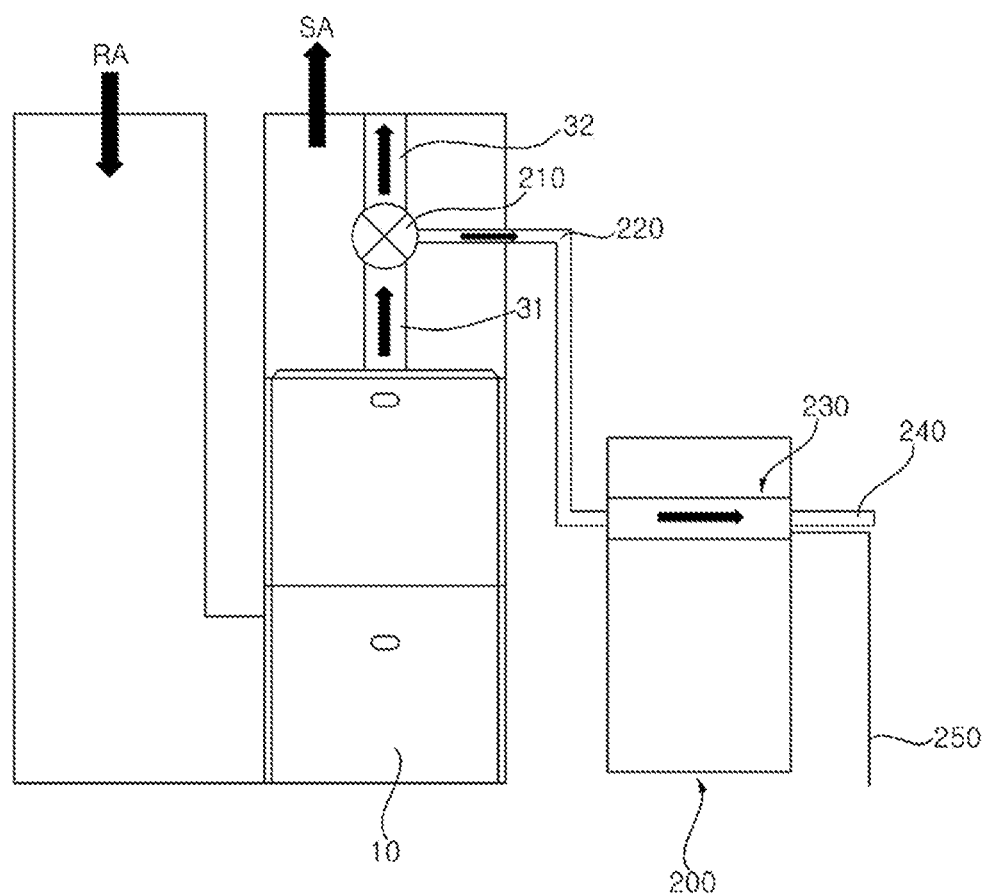
FIG. 3 is a view schematically illustrating a construction of the gas furnace according to the exemplary embodiment of the present disclosure.
Figure 4:
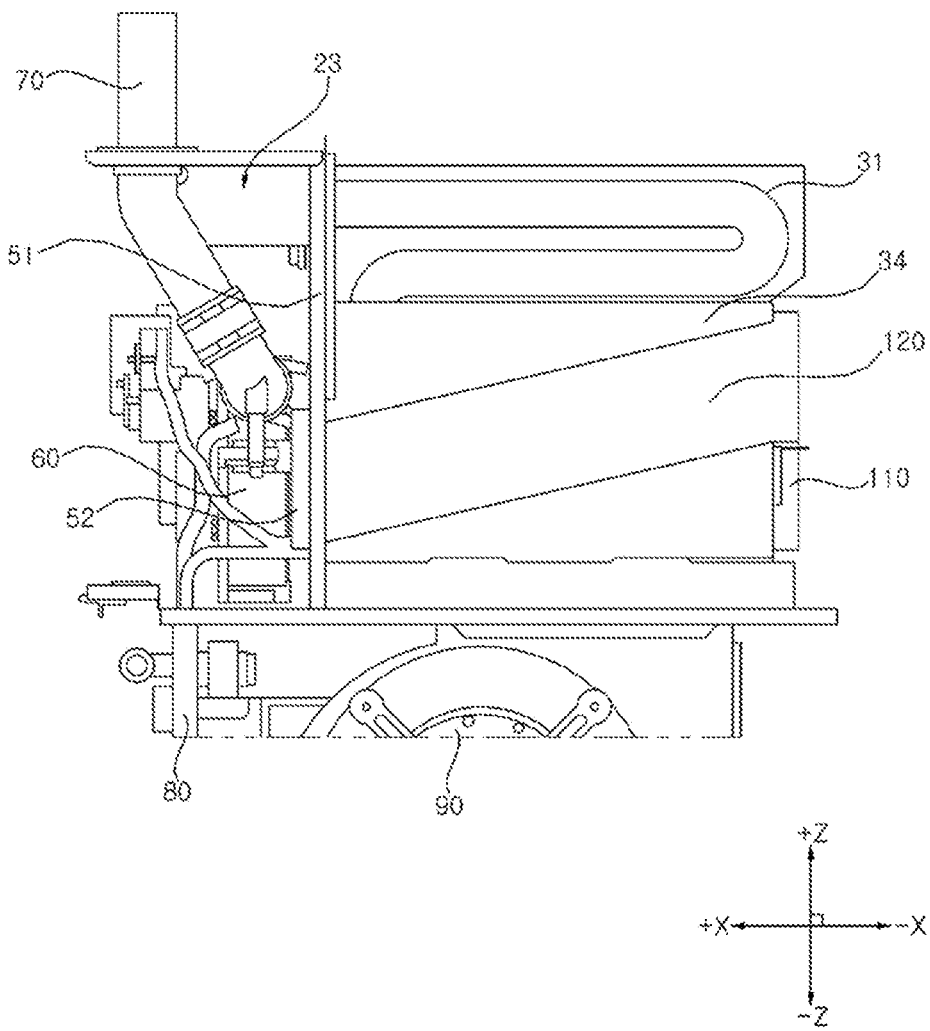
FIG. 4 is a side view of the gas furnace according to the exemplary embodiment of the present disclosure.
Figure 5:
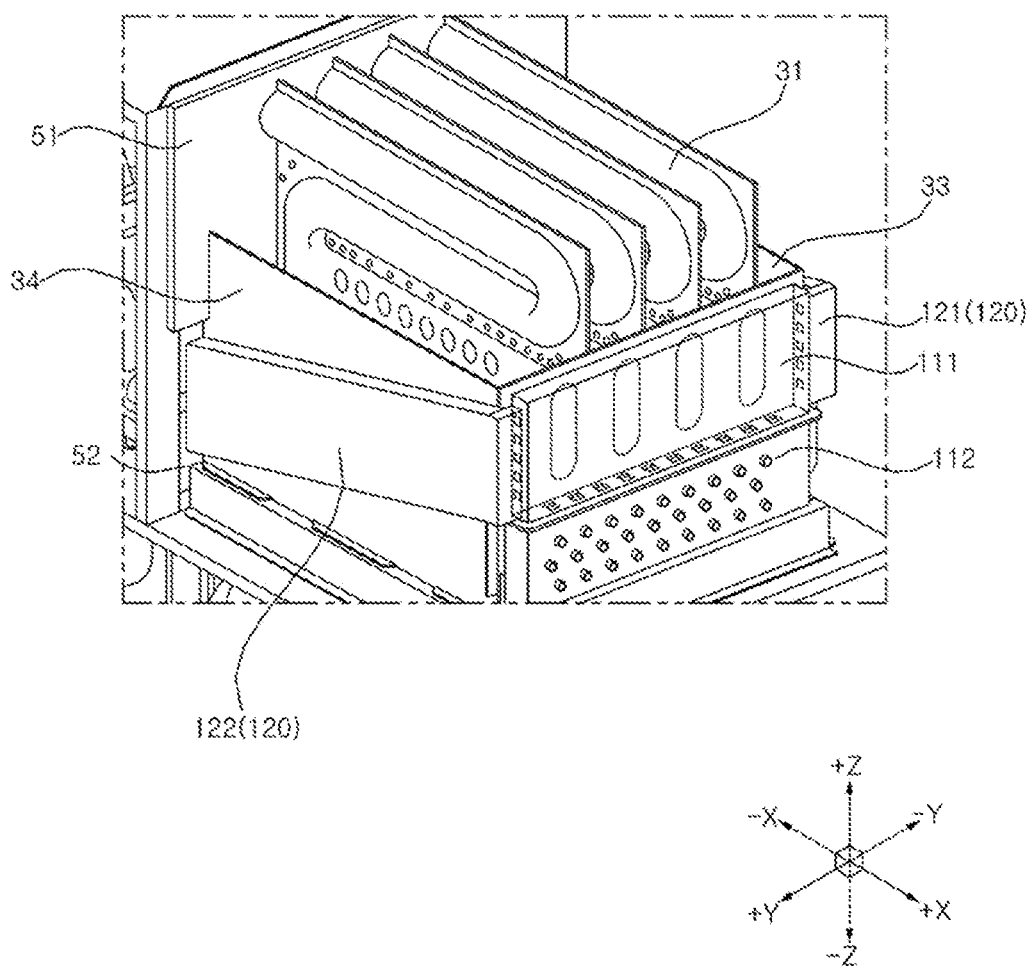
FIG. 5 is a view illustrating a heat exchanger, coupling box, and bypass pipe in the gas furnace according to the exemplary embodiment of the present disclosure.

FIG. 3 is a view schematically illustrating a construction of the gas furnace according to the exemplary embodiment of the present disclosure. FIG. 4 is a side view of the gas furnace according to the exemplary embodiment of the present disclosure. FIG. 5 is a view illustrating a heat exchanger, coupling box, and bypass pipe in the gas furnace according to the exemplary embodiment of the present disclosure.

Referring to FIG. 3, the gas furnace 10 may guide a combustion gas P flowing through the primary heat exchanger 31 to the secondary heat exchanger 32 or the hot water supply tank 200. Here, the hot water supply tank 200 is an apparatus for storing water to be supplied to an indoor space for use as hot water. When the combustion gas P passed through the primary heat exchanger 31 is guided to the hot water supply tank 200, the combustion gas P may be introduced into a heat exchange part 230 located inside the hot water supply tank 200 through a given valve 210 and piping 220. The high-temperature combustion gas P introduced into the heat exchange part 230 may heat the water stored in the hot water supply tank 200 by supplying thermal energy to the water, and then the combustion gas P may be discharged through an exhaust pipe 240 of the hot water supply tank 200. At this point, a condensate produced by the condensation of the combustion gas P in the heat exchange part 230 may be discharged through a drainage pipe 250 of the hot water supply tank 200.

Referring to FIGS. 4 and 5, the gas furnace 10 includes a coupling box 110, a bypass pipe 120, and collect box 52.

The coupling box 110 may serve as an intermediary to connect the primary heat exchanger 31 and the secondary heat exchanger 32. That is, the coupling box 110 may guide the combustion gas P passed through the primary heat exchanger 31 to the secondary heat exchanger 32. To this end, the coupling box 110 may have an opening formed on one side or in the −X axis direction, facing the primary heat exchanger 31 and the secondary heat exchanger 32.

The bypass pipe 120 may be connected to one side of the coupling box 110 and guide the combustion gas P passed through the primary heat exchanger 31 to the hot water supply tank 200. That is, the combustion gas P passed through the primary heat exchanger 31 may be guided to the secondary heat exchanger 32 or the bypass pipe 120 by the operation of a damper 132 installed on the coupling box 110 that will be described later. To this end, the bypass pipe 120 may have a flow path formed in it through which the combustion gas P flows. In an example, the bypass pipe 120 may be installed on flow guides 33 and 34 installed on one side of the gas furnace 10 so that the flow of air by the blower 90 concentrates in the heat exchanger 30 (see FIG. 1). As such, the bypass pipe 120 may be supported by the flow guides 33 and 34 and therefore fixed in a set position without swaying when the combustion gas P flows through the bypass pipe 120.

The collect box 52 may be connected to the secondary heat exchanger 32 to let in the combustion gas P passed through the secondary heat exchanger 32. Moreover, the collect box 52 may be connected to the bypass pipe 120 to let in the combustion gas P passed through the bypass pipe 120. As stated previously, since the inducer 60 is connected to the collect box 52, the inducer 60 may induce a flow of the combustion gas P passed through the primary heat exchanger 31 to allow it to enter the collect box 110 through the secondary heat exchanger 32 or bypass pipe 120 via the coupling box 110. The combustion gas P introduced into the collect box 52 after passing through the secondary heat exchanger 32 may exit through the exhaust pipe 70 past the inducer. The combustion gas P introduced into the collect box 52 after passing through the bypass pipe 120 may be guided to the hot water supply tank 200 past the inducer 60 and exit through the exhaust pipe 240.

Figure 6:
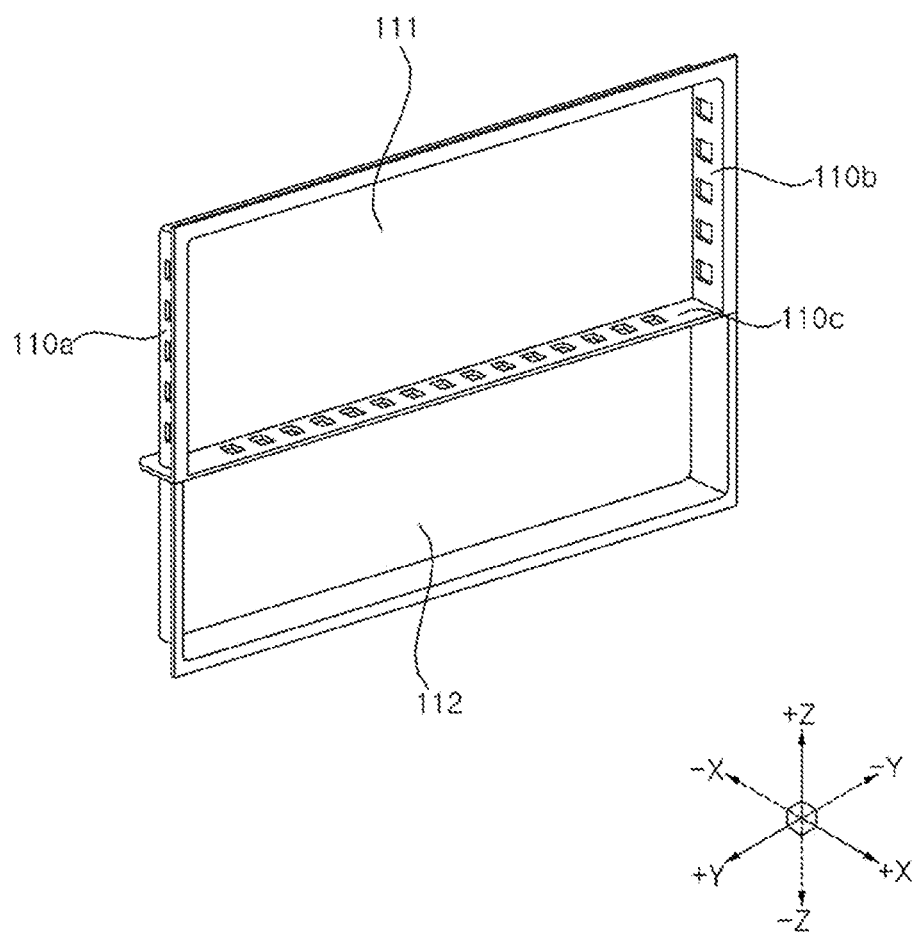
FIG. 6 is a perspective view of the coupling box of the gas furnace according to the exemplary embodiment of the present disclosure.
Figure 7:
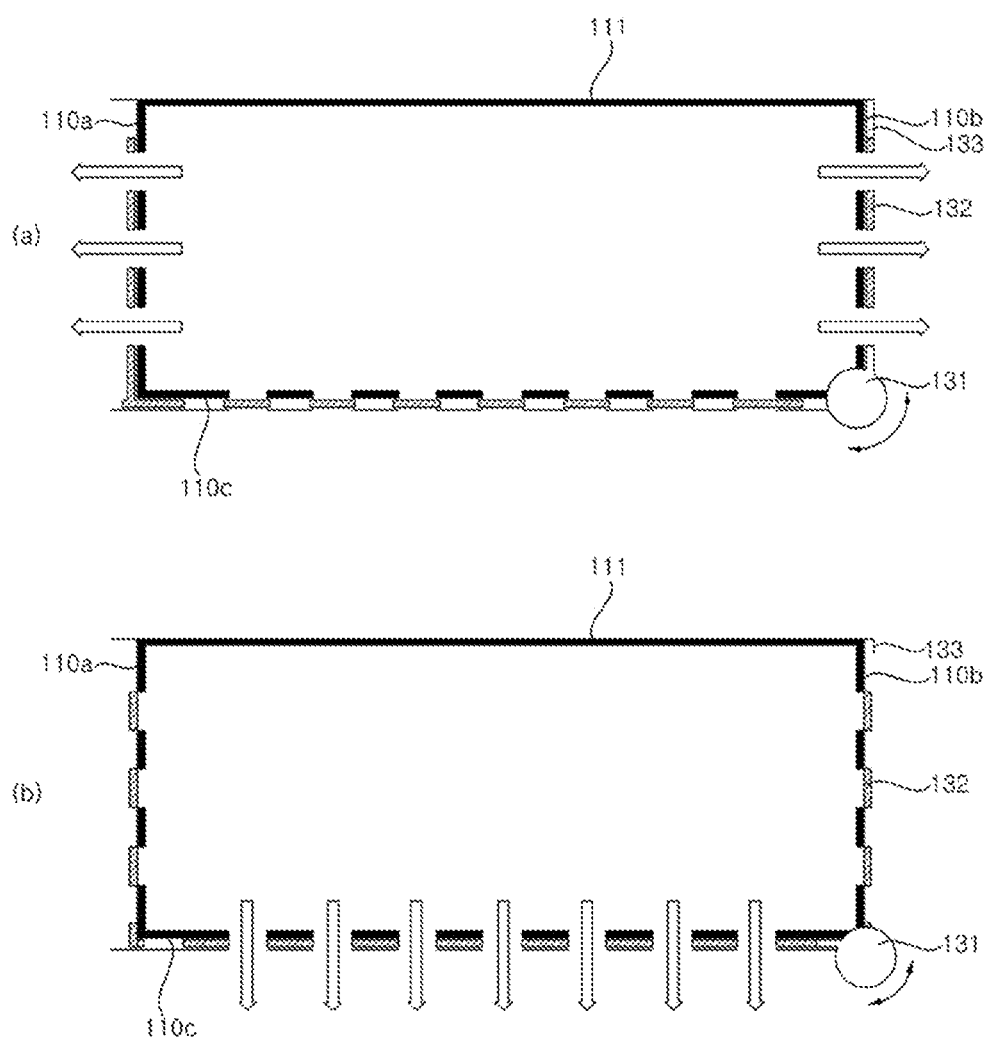
FIG. 7 is a view illustrating a damper and motor installed on the coupling box of the gas furnace according to the exemplary embodiment of the present disclosure.

FIG. 6 is a perspective view of the coupling box of the gas furnace according to the exemplary embodiment of the present disclosure. FIG. 7 is a view illustrating a damper and motor installed on the coupling box of the gas furnace according to the exemplary embodiment of the present disclosure.

Referring to FIGS. 5 and 6, the coupling box 110 may include a partition wall 110c disposed at a corresponding position between the primary heat exchanger 31 and the secondary heat exchanger 32. The partition wall 110c may divide the coupling box 110 into a first box 111 communicating with the primary heat exchanger 31 and a second box 112 communicating with the secondary heat exchanger 32. That is, the combustion gas P passed through the primary heat exchanger 31 may be collected in the first box 111 along the −X axis direction, and the combustion gas P may be introduced into the secondary heat exchanger 32 from the second box 112 along the +X axis direction.

The partition wall 110c may have a plurality of first holes formed therein to allow the first box 111 and the second box 112 to communicate with each other. Moreover, the first box 111 may have a plurality of second holes formed in a sidewall (hereinafter, first box sidewall) 110a and 110b adjacent to the partition wall 110c to allow the first box 111 and the bypass pipe 120 to communicate with each other.

The bypass pipe 120 may include a first bypass pipe 121 and a second bypass pipe 122, with one end of each being connected to the first box sidewall 110a and 110b, spaced apart from each other in the lengthwise direction or +Y axis direction of the partition wall 110c. Moreover, the other end of the bypass pipe 120 opposite the one end may be connected to the collect box 52. As such, the combustion gas P introduced into the first and second bypass pipes 121 and 122 through the first box sidewall 110a and 110b may be supplied to the collect box 52.

The one end of the bypass pipe 120 may be positioned higher than the other end. That is, the bypass pipe 120 may be sloped downward. As a result, the combustion gas P may be naturally collected into the collect box 52 along the slope of the bypass pipe 120, even when the combustion gas P condenses to form a condensate while flowing through the bypass pipe 120. In this case, the condensate collected in the collect box 52 may be discharged through the condensate trap 80.

Referring to FIGS. 6 and 7, the gas furnace 10 may include a damper 132 and a motor 131, in order to guide the combustion gas P passed through the primary heat exchanger 31 to flow to either the secondary heat exchanger 32 or the bypass pipe 120 by opening and closing the first and second holes.

The damper 132 may be disposed on the partition wall 110c and the first box sidewall 110a and 110b to open either the first or second holes and close the others. Moreover, the motor 131 may be electrically driven and provide power for varying the position of the damper 132. In an example, if a presser connected to the motor 131 is in a first position, the damper 132 may be in a position that closes the first holes and opens the second holes while applying pressure on an elastic member 133 (see (a) of FIG. 7). In addition, if the pressure connected to the motor 131 is in a second position, the damper 132 may be moved by the restoring force of the elastic member 133 and placed in a position that opens the first holes and closes the second holes (see (b) of FIG. 7). However, this is only an illustration, and the configuration and method for opening and closing the first and second holes are not limited to what has been described above.

Meanwhile, the gas furnace 10 may include a controller for controlling the operation of the damper 132 in such a way that, upon receiving a heating operation signal, the damper 132 opens the first holes and closes the second holes and, upon receiving a heating and hot water supply operation signal, the damper 132 closes the first holes and opens the second holes.

Figure 8:
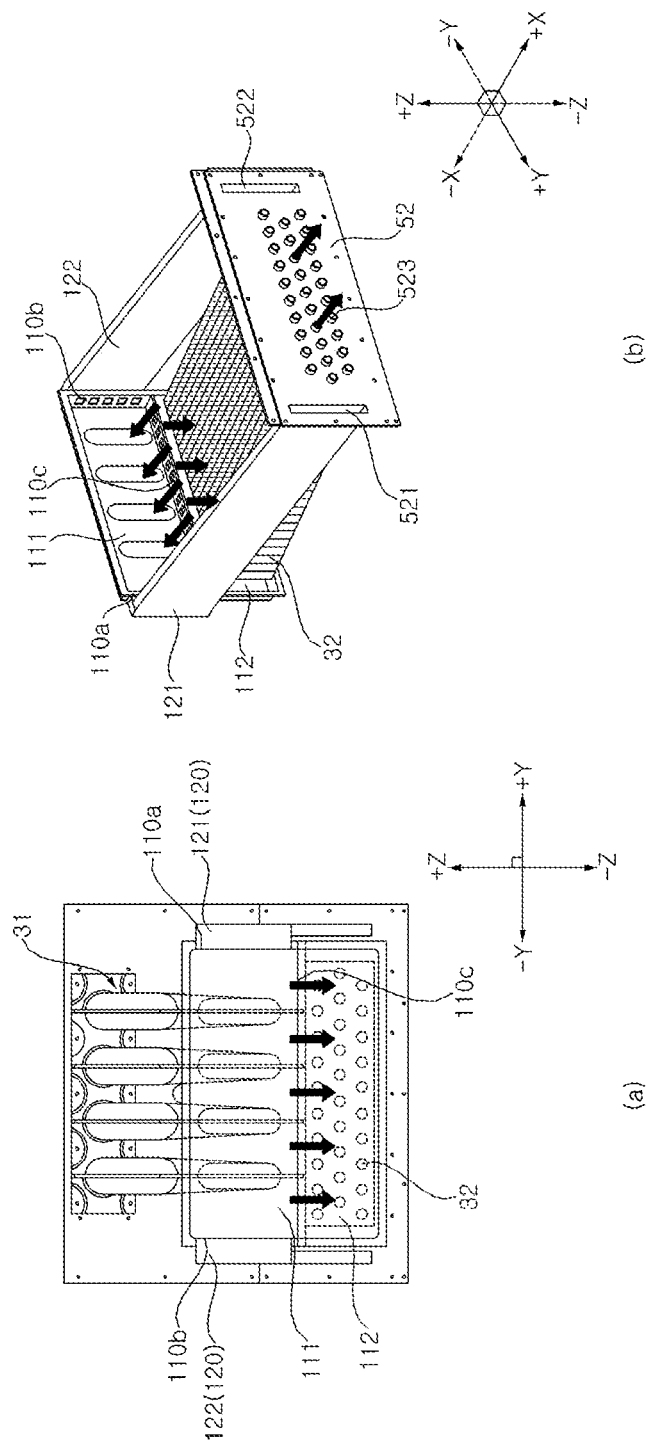
FIGS. 8 and 9 are views illustrating a path through which combustion gas flows in the gas furnace according to the exemplary embodiment of the present disclosure.
Figure 9:
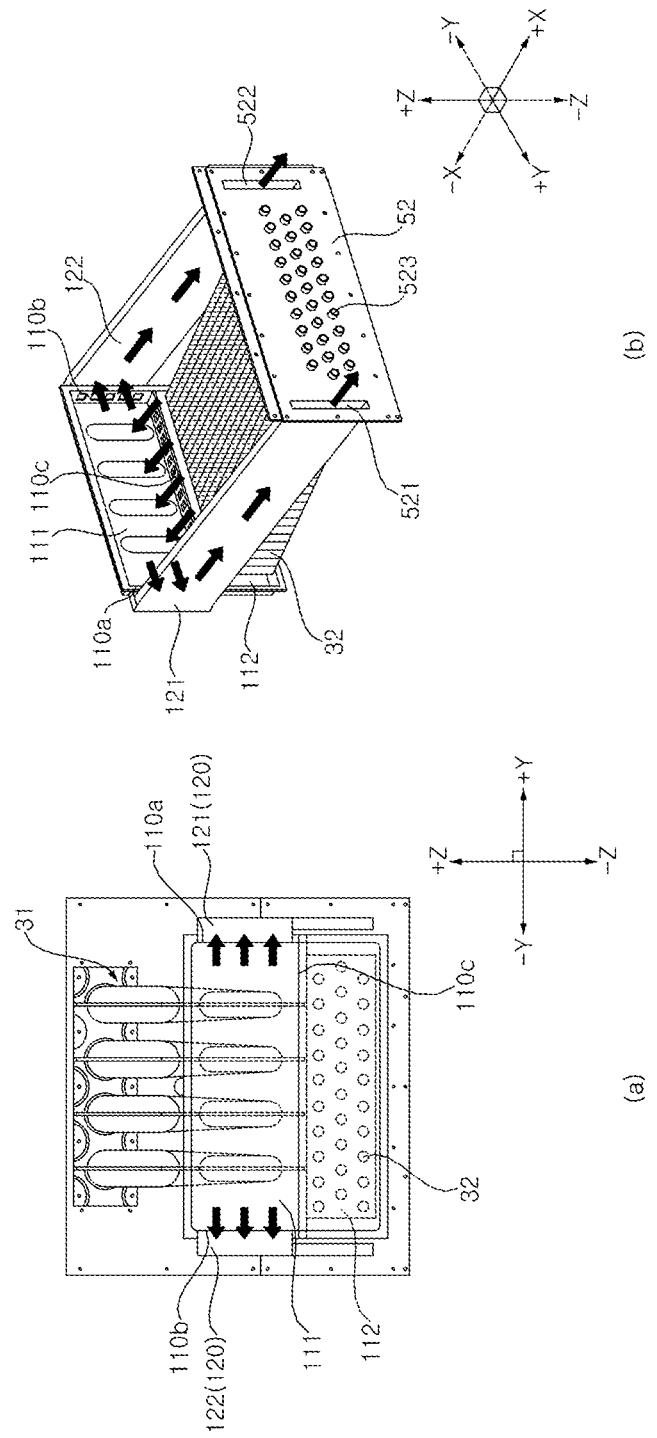

FIGS. 8 and 9 are views illustrating a path through which combustion gas flows in the gas furnace according to the exemplary embodiment of the present disclosure.

Referring to FIG. 8, when the first holes are opened and the second holes are closed, the combustion gas P passed through the primary heat exchanger 31 may be introduced into the first box 111 and guided to the second box 112 and the secondary heat exchanger 32 via the first holes formed in the partition wall 110c. Subsequently, the combustion gas P passed through the secondary heat exchanger 32 may be introduced into the inducer 60 via pass-through holes 523 formed in the collect box 52 and then discharged through the exhaust pipe 70.

Referring to FIG. 9, when the first holes are closed and the second holes are opened, the combustion gas P passed through the primary heat exchanger 31 may be introduced into the first box 111 and guided to the first and second bypass pipes 121 and 122 via the second holes formed in the first box sidewall 110a and 110b. Subsequently, the combustion gas P passed through the first and second bypass pipes 121 and 122 may be introduced into the inducer 60 via first and second pass-through slots 523 formed in the collect box 52 and then discharged through the exhaust pipe 240 of the hot water supply tank 200.

Figure 10:
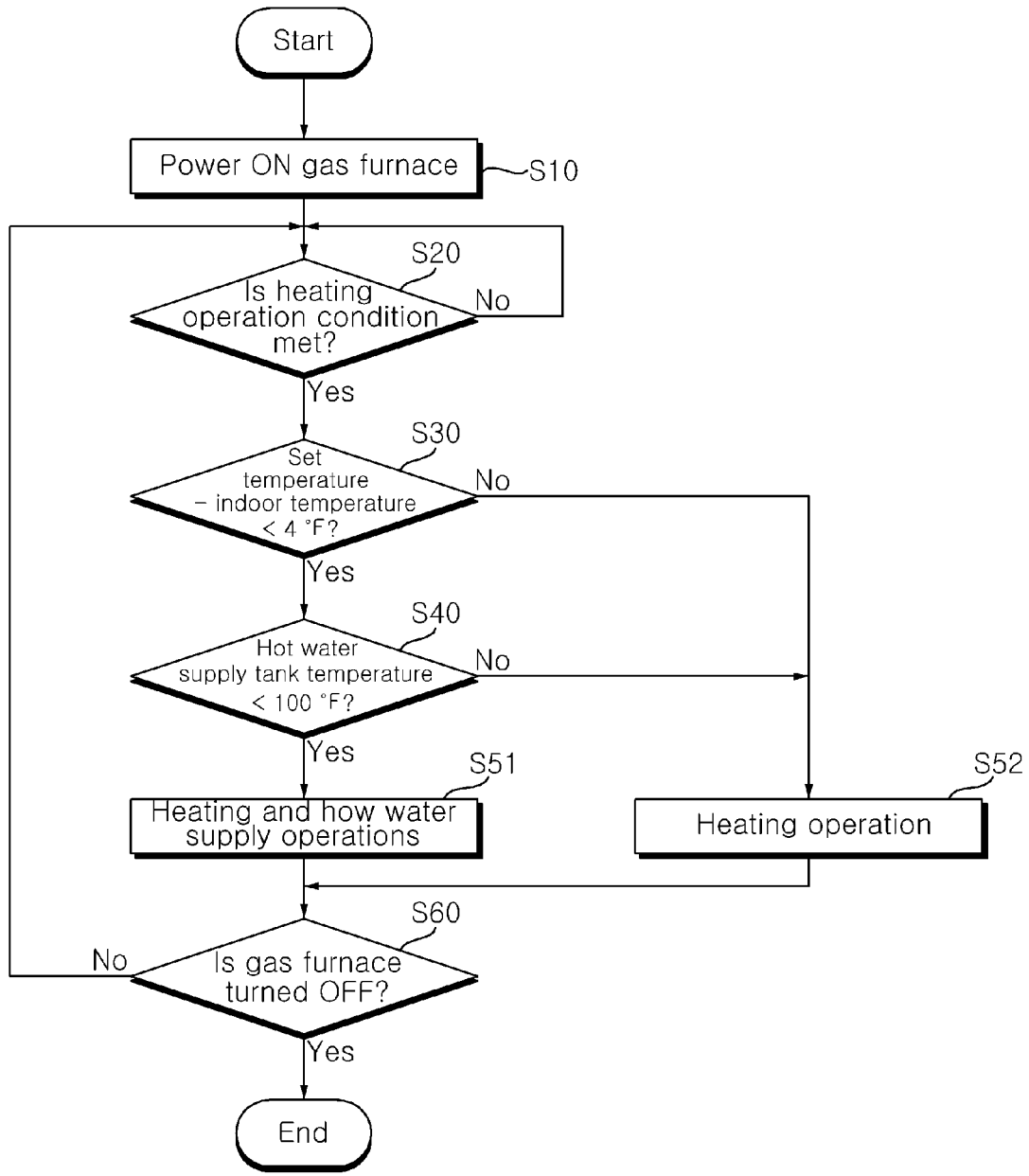
FIG. 10 is a flowchart of a method for controlling the operation of a gas furnace according to the exemplary embodiment of the present disclosure.

FIG. 10 is a flowchart of a method for controlling the operation of a gas furnace according to the exemplary embodiment of the present disclosure. Here, the steps of the control method to be described below may be performed by means of the controller.

Referring to FIG. 10, the control method for the gas furnace 10 may be performed after the step S10 of powering ON the gas furnace 10. When the gas furnace 10 is powered ON, the gas furnace 10 may be in operation or not in operation. Here, the expression "the gas furnace 10 in operation" means that a flame and high-temperature combustion gas P produced by the combustion of a fuel gas R introduced from the gas valve 21 and manifold 22 flows through the heat exchanger 30. On the other hand, the expression "the gas furnace 10 not in operation" means that the gas valve 21 blocks the fuel gas R from entering the manifold 22 or the burner 23.

After the step S10, the step S20 of determining whether a condition of heating operation is met may be performed. In the step S20, if the indoor temperature is lower than a set temperature entered by a person in the room, the condition of heating operation may be met. In some embodiments, the condition of heating operation may be met if a person in the room gives input for heating operation.

If it is determined that the condition of heating operation is met in the step S20, the step S30 of determining whether the indoor temperature is lower than the set temperature and whether the difference between the indoor temperature and the set temperature (hereinafter, temperature difference) is less than a first temperature value may be performed. In an example, the first temperature value may be 4° F.

If it is determined that the temperature difference is less than the first temperature value in the step S30, the step S40 of determining whether the temperature of the hot water supply tank 200 is less than a second temperature value may be performed. Here, the temperature of the hot water supply tank 200 is the temperature of water stored in the hot water supply tank 200 to be supplied to an indoor space for use as hot water. In an example, the second temperature value may be 100° F.

If it is determined that the temperature of the hot water supply tank 200 is less than the second temperature value in the step S40, the step S51 of performing heating and hot water supply operations may be performed. As the step S51 is performed, a heating and hot water supply operation signal may be issued and sent to the controller. Upon receiving the heating and hot water supply operation signal, the controller may control the operation of the damper 132 to close the first holes and open the second holes such that the combustion gas P passes through the primary heat exchanger 31 and is then guided to the hot water supply tank 200 via the bypass pipe 120.

If it is determined that the temperature difference is equal to or larger than the first temperature value in the step 30, the step S52 of performing a heating operation may be performed. The step S52 may also be performed when it is determined that the temperature of the hot water supply tank 200 is equal to or larger than the second temperature value. As the step S52 is performed, a heating operation signal may be issued and sent to the controller. Upon receiving the heating operation signal, the controller may control the operation of the damper 132 to open the first holes and close the second holes such that the combustion gas P passes through the primary heat exchanger 31 and is then guided to the secondary heat exchanger 32

After the step S51 or the step S52, the step S60 of determining whether the gas furnace 10 is powered OFF may be performed. In the step S60, if it is determined that the gas furnace 10 is powered OFF, the control method for the gas furnace 10 may be ended. On the other hand, if it is determined that the gas furnace 10 is not powered OFF, the flow may return to the step S20.

In the above, a gas furnace according to an exemplary embodiment of the present disclosure has been described with reference to the accompanying drawings. However, the present disclosure is not limited to the above embodiments, and it will be apparent to those skilled in the art that various modifications or implementations within the equivalent scopes can be made without departing from the subject matter of the present disclosure.

The present disclosure provides one or more of the following advantages.

Firstly, it is possible to supply energy required for indoor hot water supply as well as for indoor heating because the bypass pipe guides the combustion gas flowing through the heat exchanger to the hot water supply tank.

Secondly, it is possible to allow combustion gas to pass through the primary heat exchanger and the secondary heat exchanger or pass through the primary heat exchanger and the bypass pipe, because the partition wall of the coupling box separates the first box communicating with the primary heat exchanger and the second box communicating with the secondary heat exchanger and has holes for communication between the first and second boxes and communication between the first box and the bypass pipe.

What is claimed is:

1. A gas furnace including a primary heat exchanger and a secondary heat exchanger through which a combustion gas produced by the combustion of a fuel gas flows, the gas furnace comprising:
   a coupling box connecting the primary heat exchanger and the secondary heat exchanger;
   a collect box connected to the secondary heat exchanger and into which the combustion gas passed through the secondary heat exchanger is introduced;
   an inducer connected to the collect box and causing a flow of the combustion gas; and
   a bypass pipe connected to one side of the coupling box and guiding the combustion gas passed through the primary heat exchanger to a hot water supply tank,
   wherein the primary heat exchanger communicates with the secondary heat exchanger or the bypass pipe through the coupling box,
   wherein the coupling box has an opening facing the primary heat exchanger and secondary heat exchanger, and comprises a partition wall disposed at a corresponding position between the primary heat exchanger and the secondary heat exchanger,
   wherein the partition wall divides the coupling box into a first box and a second box which communicate with the primary heat exchanger and secondary heat exchanger, respectively.

2. The gas furnace of claim 1, wherein the partition wall has a plurality of first holes formed therein to allow the first box and the second box to communicate with each other, and the first box has a plurality of second holes formed in a first box sidewall adjacent to the partition wall to allow the first box and the bypass pipe to communicate with each other.

3. The gas furnace of claim 2, wherein the bypass pipe further comprises a first bypass pipe and a second bypass pipe, with one end of each being connected to the first box sidewall, spaced apart from each other in the lengthwise direction of the partition wall.

4. The gas furnace of claim 2, wherein the other end of the bypass pipe opposite the one end is connected to the collect box.

5. The gas furnace of claim 4, wherein the one end of the bypass pipe is positioned higher than the other end.

6. The gas furnace of claim 2, wherein the gas furnace comprises:
   a damper disposed on the partition wall and the first box sidewall to open either the first or second holes and close the others; and
   a motor electrically driven and providing power for varying the position of the damper.

7. The gas furnace of claim 6, wherein the gas furnace comprises a controller for controlling the operation of the damper in such a way that, upon receiving a heating operation signal, the damper opens the first holes and closes the second holes and, upon receiving a heating and hot water supply operation signal, the damper closes the first holes and opens the second holes.

8. The gas furnace of claim 7, wherein the heating operation signal is issued when an indoor temperature is lower than a set temperature and the difference between the indoor temperature and the set temperature is equal to or larger than a first temperature value, or when the temperature difference is less than the first temperature value and the temperature of water stored in the hot water supply tank to be supplied to an indoor space for use as hot water is equal to or higher than a second temperature value.

9. The gas furnace of claim 8, wherein the heating and hot water supply operation signal is issued when the temperature difference is less than the first temperature value and the temperature of the water is less than the second temperature value.

\* \* \* \* \*